US010671099B2

(12) United States Patent
Ansari et al.

(10) Patent No.: US 10,671,099 B2
(45) Date of Patent: Jun. 2, 2020

(54) GAS ASSISTED CHEMICAL INJECTION SYSTEM

(71) Applicant: SAUDI ARABIAN OIL COMPANY, Dhahran (SA)

(72) Inventors: Nisar Ahmad K. Ansari, Ras Tanura (SA); Samusideen Adewale Salu, Ras Tanura (SA); Talal Al-Zahrani, Khobar (SA); Mohamed Soliman, Ras Tanura (SA)

(73) Assignee: SAUDI ARABIAN OIL COMPANY (SA)

( * ) Notice: Subject to any disclaimer, the term of this patent is extended or adjusted under 35 U.S.C. 154(b) by 124 days.

(21) Appl. No.: 15/866,055

(22) Filed: Jan. 9, 2018

(65) Prior Publication Data

US 2018/0196448 A1    Jul. 12, 2018

Related U.S. Application Data

(60) Provisional application No. 62/444,023, filed on Jan. 9, 2017.

(51) Int. Cl.
*G05D 11/13* (2006.01)
*B01J 4/00* (2006.01)
(Continued)

(52) U.S. Cl.
CPC .......... *G05D 11/132* (2013.01); *B01J 4/008* (2013.01); *B05C 11/1026* (2013.01);
(Continued)

(58) Field of Classification Search
CPC ..... G05D 11/132; B05C 11/1026; B01J 4/008
See application file for complete search history.

(56) References Cited

U.S. PATENT DOCUMENTS 5,176,164 A    1/1993   Boyle
5,209,301 A    5/1993   Ayres
(Continued)

FOREIGN PATENT DOCUMENTS

EP    0749058 A2    12/1996

OTHER PUBLICATIONS

Forbes Marshall Steam Operated Condensate Pump, found at www.forbesmarshall.com/fm_micro/Products5.aspx?, at least by Dec. 2017.
(Continued)

*Primary Examiner* — Kevin L Lee
(74) *Attorney, Agent, or Firm* — Bracewell LLP; Constance Rhebergen

(57)    ABSTRACT

A system and method for dispensing an injection material to an injection point. The injection material is stored in a tank and disposed to parallel piped vessels. An orifice is disposed in piping connected to discharge ends of the vessels, and has an opening with a designated cross sectional area. A high pressure fluid drives the injection material to the injection point; the pressure of the high pressure fluid is regulated with a pressure control valve. Valves in the inlet and discharge piping connected to the vessels are selectively opened and closed so that injection material flows to and from the vessels. Vessels vent to a recycle/recovery system to reduce vessel pressure enabling refilling with injection material. Valves in the pressurizing and depressurizing lines are selectively opened and closed to depressurize and refill the vessels to have continuous chemical injection to the injection location.

20 Claims, 5 Drawing Sheets

(51) Int. Cl.
  B05C 11/10 (2006.01)
  G05D 7/06 (2006.01)
  *F17C 13/04* (2006.01)
  *F04B 13/02* (2006.01)
  *F04F 1/06* (2006.01)

(52) U.S. Cl.
  CPC ............ G05D 7/0658 (2013.01); *F04B 13/02* (2013.01); *F04F 1/06* (2013.01); *F17C 13/04* (2013.01)

(56) References Cited

U.S. PATENT DOCUMENTS

| | | | |
|---|---|---|---|
| 5,343,941 | A | 9/1994 | Raybon |
| 5,944,074 | A * | 8/1999 | Leahy et al. ............ B67D 7/743 141/104 |
| 6,170,703 | B1 | 1/2001 | Butler et al. |
| 6,767,877 | B2 | 7/2004 | Kuo et al. |
| 6,779,548 | B2 | 8/2004 | McKeary |
| 7,066,353 | B2 | 6/2006 | Hammonds |
| 8,584,691 | B2 | 11/2013 | Hammonds |
| 2004/0084081 | A1 | 5/2004 | Liu et al. |
| 2006/0056924 | A1* | 3/2006 | Jurkovich .............. B65G 53/66 406/39 |
| 2016/0009488 | A1 | 1/2016 | Hudala et al. |

OTHER PUBLICATIONS

M. Daas, Downhole Chemical Injection Through Gas Lift: Options and Consequences, Jun. 14-17, 2011.
Spirax Sarco Ogden Automatic Pump Insstruction Manual, IM-P015-12 ST Issue 3, 1998.
TLV Power Trap, found at www.tlv.com/global/US/product-operation/powertrap-gp10.html, at least by Dec. 2017.
International Search Report and Written Opinion dated May 24, 2018 of related application PCT/US2018/012907.

* cited by examiner

GAS ASSISTED CHEMICAL INJECTION SYSTEM

CROSS-REFERENCE TO RELATED APPLICATION

This application claims priority from U.S. Provisional Application Ser. No. 62/444,023, filed Jan. 9, 2017, the full disclosure of which is incorporated by reference herein in its entirety and for all purposes.

BACKGROUND

1. Field

The present disclosure relates to a system and method for injecting additives to a primary amount of material. More specifically, the present disclosure relates to a system and method that uses a gas for injecting chemicals into a process.

2. Related Art

During manufacturing or production processes, chemicals or other additives (injection substance) are often introduced into a primary material, where the primary material is within a flow stream or stored in a vessel. The injection substance is sometimes used for adjusting properties of the primary material, such as its density, viscosity, pH, freezing/boiling point, and the like. On occasion the injection substance adjusts properties or characteristics of the primary material so that the handling equipment (for example, pipes, valves, fittings) is less susceptible to damage. Chemical injection substances are also used to assist processes in industry such as demulsification, deoxygenation, or inhibit undesirable processes such as corrosion, scaling and deposition.

Conventional chemical injection systems typically include tanks, pumps, valves, and instrumentation. Pumps in traditional chemical injection systems are often employed to pressurize the injection material so that it can flow to an injection site, and arrive at a pressure sufficient for injection into the primary material. The pumps are usually reciprocating and driven by electrically powered motors. The pumps, motor, and couplings engaging the pump and motor all require inspection and maintenance. Moreover, injection capability can be lost through mechanical failure of the pump or motor, or a loss of electrical supply to the motor.

SUMMARY

Disclosed is an example of a method a method of dispensing an injection material, and which includes directing injection material into a first vessel, pressurizing the first vessel to a specified pressure, discharging a designated amount of the injection material from the first vessel, directing the injection material from the first vessel to an injection location, depressurizing the first vessel, and repeating the steps of directing, pressurizing, and discharging using a second vessel. The method optionally includes regulating a flow of the injection material directed from the first vessel with an orifice having an opening with a designated cross sectional area. In one alternative, the method further includes directing injection material from the second vessel to the injection location while suspending the step of directing injection material from the first vessel to the injection location. In an example, the method further includes directing injection material to the second vessel while suspending the step of directing injection material into the first vessel. In this example, an inlet piping circuit provides fluid communication between a tank in which injection material is stored and the first and second vessels, and a discharge circuit provides fluid communication between the first and second vessels and the injection location. Further in this example, valves are provided in the inlet and outlet piping circuits that are selectively opened and closed to selectively direct injection material from and to the vessels. In an embodiment, a controller is used to direct command signals to actuators mounted to the valves for opening and closing the valves. Further optionally, pressurized fluid is vented from one of the first or second vessels to a recycle/recovery system. In an alternative, the injection material flows to the injection location continuously and uninterrupted. In one embodiment, pressurized fluid is vented between the first and second vessels.

Also disclosed is a method of dispensing an injection material, and which includes directing injection material into a vessel, directing pressurized fluid across a pressure control valve and to the vessel to pressurize the vessel to a specified pressure, discharging a designated amount of the injection material from the vessel to an injection location, and controlling the amount of injection material flowing from the vessel at the designated amount by flowing the injection material through an orifice having an opening with a particular cross sectional area in conjunction with maintaining a pressure of the pressurized fluid directed across the pressure control valve at the specified pressure. In an alternative to the method, the vessel is a first vessel, the method further include depressurizing the first vessel; and repeating steps of directing, discharging, and controlling using a second vessel.

Also disclosed is a system for dispensing injection material and which includes a vessel that selectively contains the injection material, a pressure control valve having in inlet in communication with a pressure source, and an outlet in communication with the vessel having a varying pressure so that pressure in the vessel is at a designated value, a piping circuit having ends connected to the vessel and to an injection location so that the vessel and injection location are in communication through the piping circuit, an orifice in the piping circuit having an opening with a particular cross sectional area, and a controller in signal communication with the pressure control valve and a flow meter in the piping circuit that provides commands to the pressure control valve based on a comparison of a rate of flow of the injection material measured by the flowmeter and a designated rate of flow of the injection material. Alternatively, the particular cross sectional area of the opening in the orifice is strategically sized, so that the rate of flow of injection material is substantially the same as the designated amount of injection material is metered to the injection location when pressure at the pressure control valve outlet is substantially at the designated value. Optionally, the vessel is a first vessel, and a second vessel is included with the system. The piping circuit can further include inlet piping in communication with inlets formed in the first and second vessels and also in communication with a tank in which injection material is stored. In an embodiment, the system further includes a pressure discharge circuit having an end in communication with the vessel, and a distal end in communication with a recycle/recovery system. The injection location can be a position such as a portion of a processing facility or a storage tank. In an example, the injection material alters a physical property of compounds in the injection location.

BRIEF DESCRIPTION OF DRAWINGS

Some of the features and benefits of that in the present disclosure having been stated, others will become apparent as the description proceeds when taken in conjunction with the accompanying drawings, in which.

Figure 1:
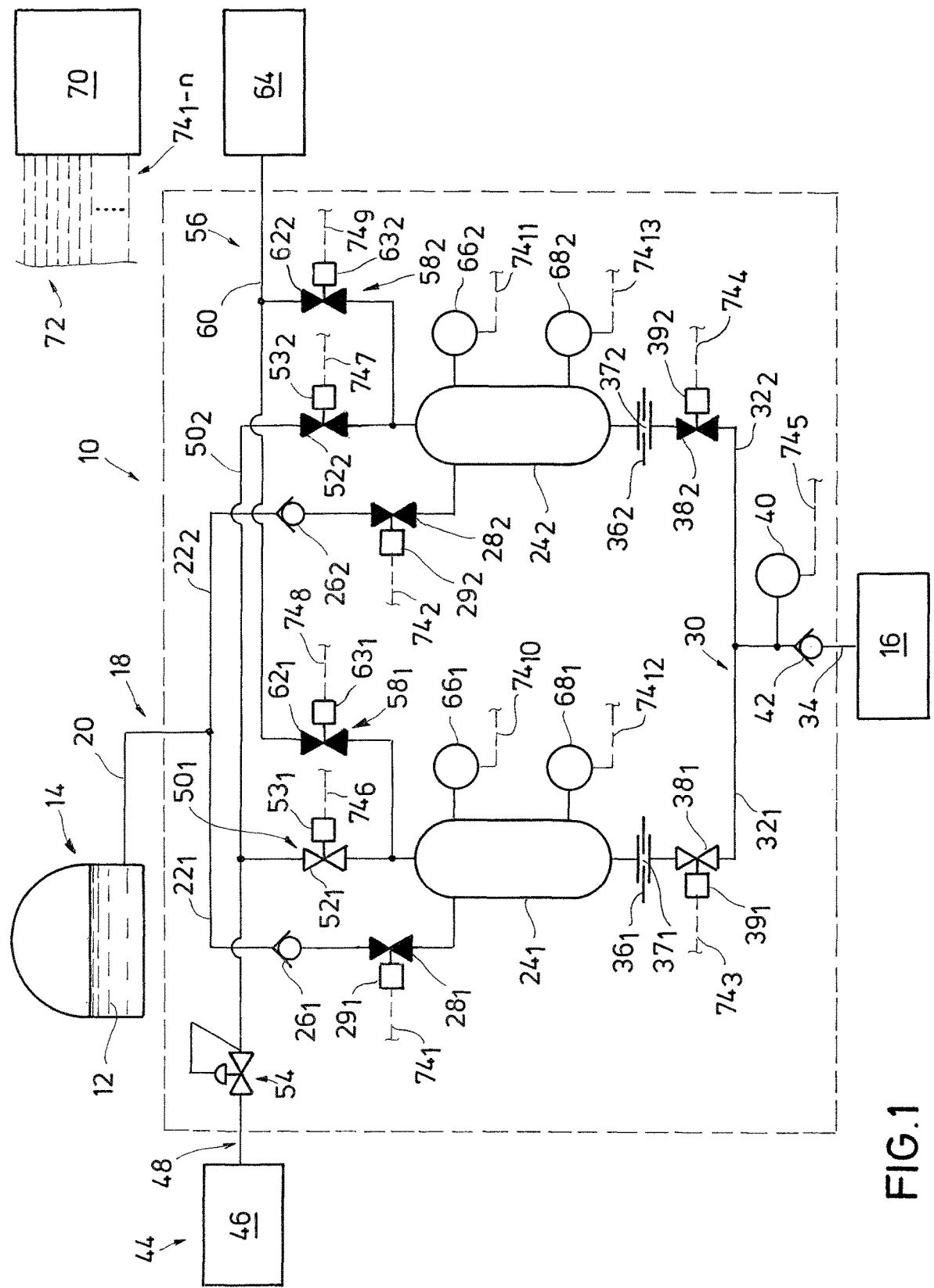
FIG. 1 is a schematic of an example of an injection system having first and second vessels containing injection material, and where injection material is being dispensed from the first vessel and metered with an orifice while the second vessel is on standby.

While that disclosed will be described in connection with the preferred embodiments, it will be understood that it is not intended to limit that embodiments. On the contrary, it is intended to cover all alternatives, modifications, and equivalents, as may be included within the spirit and scope of that described.

DETAILED DESCRIPTION

The method and system of the present disclosure will now be described more fully with reference to the accompanying drawings in which embodiments are shown. The method and system of the present disclosure may be in many different forms and should not be construed as limited to the illustrated embodiments set forth; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in schematic form in FIG. 1 is one example of a chemical injection system 10 which directs injection material 12 housed within storage tank 14 and into an injection location 16. Examples exist where the injection material 12 is solid, liquid/gas, or two-phase, and is used for adjusting properties of substances, such as fluids, gases or solids, contained within the injection location 16. Examples of the injection location 16 include processing facilities (not shown), such as plants for synthesizing chemicals, or those that isolate components of feed stock, such as refineries. In an embodiment the injection location 16 further includes storage containers, as well as transmission lines that transmit various fluids, such as crude oil, water, hydrocarbons, or mixtures thereof.

The system 10 of FIG. 1 includes an injection material inlet circuit 18 shown having injection material inlet line 20 and injection material inlet leads $22_1$, $22_2$ that extend from an end of the injection material chemical inlet line 20. The illustrated example of the inlet line 20 has one end in communication with the injection material 12 within storage tank 14 and an opposite end in communication with the leads $22_1$, $22_2$. The leads $22_1$, $22_2$ of this example have ends distal from the inlet line 20 that respectfully connect to vessels $24_1$, $24_2$, and in which the injection material 12 is transported from the storage tank 14 to the vessels $24_1$, $24_2$. Optional check valves $26_1$, $26_2$ are provided within inlet leads $22_1$, $22_2$. The check vales $26_1$, $26_2$ block flow from vessels $24_1$, $24_2$ back to inlet line 20, while allowing flow in a direction from inlet line 20 and into vessels $24_1$, $24_2$. Injection material inlet valves $28_1$, $28_2$ are provided respectively in the inlet leads $22_1$, $22_2$ and which in an example are selectively opened or closed to thereby control the inflow of the injection material 12 into the vessels $24_1$, $24_2$.

Motors $29_1$, $29_2$ are optionally provided that generate an actuating force for opening and closing valves $28_1$, $28_2$. A discharge circuit 30 is included in the example of FIG. 1, and shown being made up of piping for transferring the injection material 12 from vessels $24_1$, $24_2$ and into the injection location 16. Discharge leads $32_1$, $32_2$ are included with the illustrated discharge circuit 30, and which have ends connected respectively to outlet ports of vessels $24_1$, $24_2$ and opposite ends that terminate at a discharge line 34. Discharge leads $32_1$, $32_2$ provide selective communication between vessels $24_1$, $24_2$ and discharge line 34. An end of discharge line 34 opposite the discharge leads $32_1$, $32_2$ couples with the injection location 16. In the illustrated example, orifice members $36_1$, $36_2$ are respectively disposed in discharge leads $32_1$, $32_2$. In the example of FIG. 1, the orifice members $36_1$, $36_2$ are generally planar and have openings $37_1$, $37_2$ formed therethrough that are strategically sized to meter a designated amount of the injection material 12 through discharge leads $32_1$, $32_2$ and onto the injection location 16. In one embodiment the openings $37_1$, $37_2$ have cross sectional areas that are less than cross sectional areas in the discharge leads $32_1$, $32_2$. Examples exist where the designated amount is an amount of flow per time, such as mass or weight per time of the injection material 12 (for example, kilograms per hour ["kg/hr"]), or a volume of the injection material 12 per time (for example, cubic meters/hour ["m$^3$/hr"]). Optionally, the designated amount is a total mass, weight, or volume of the injection material 12. It is well within the capabilities of those skilled in the art to provide orifice members $36_1$, $36_2$ with openings $37_1$, $37_2$ of a size to achieve a designated amount of flow of the injection material 12 into the injection location 16. In an alternative, control valves are used in place of the orifice members $36_1$, $36_2$ to regulate the amount of flow of the injection material 12. Embodiments of the alternative control valves include ball valves or gate valves with openings selectively adjusted to varying cross sectional areas. Injection material outlet valves $38_1$, $38_2$ are shown disposed within the leads $32_1$, $32_2$, and which selectively allow or block flow through leads $32_1$, $32_2$ when opened or closed by energizing valve motors $39_1$, $39_2$. Further in the illustrated example is an optional flow indicator 40 that is in communication with discharge line 34, and that monitors the amount of injection material 12 within outlet line 34. Also, a check valve 42 may be included within outlet line 34 to ensure that flow direction is restricted to direct the flow from the vessels $24_1$, $24_2$ to the injection location 16 and not from the injection location 16 and back to vessels $24_1$, $24_2$.

Still referring to FIG. 1 the example of the chemical injection system 10 further includes an injection pressure circuit 44 that selectively pressurizes vessels $24_1$, $24_2$ to a specified pressure. Pressurizing vessels $24_1$, $24_2$ to a specified value generates a certain motive force so that flow of the injection material 12 into the injection location 16 is substantially at a designated amount of flow. In an example, a designated amount of flow is dictated by the needs of the primary fluids for material located within injection location 16. Included within the injection pressure circuit 44 is an injection pressure source 46. Examples of a pressure source 46 include a flow line having pressurized fluid, a tank having pressurized fluid, a compressor, a pump, or any other known or later developed means or device for providing a pressurized fluid. Examples of pressurized fluid include any gas or vapor, such as air or nitrogen. As described in further detail, the magnitude of the pressure is that which is sufficient to drive the designated amount of flow of the injection material 12 to and into the injection location 16. Further illustrated in this example is a discharge of the injection pressure source 46 connected to an injection pressure inlet line 48, that in combination with injection pressure inlet leads $50_1$, $50_2$, selectively communicate the pressurized fluid from the injection pressure source 46 to the vessels $24_1$, $24_2$. In an embodiment, an injection pressure inlet valve $52_2$ is included within injection pressure inlet line 48 between vessel $24_2$ and a pressure control valve 54. Injection pressure inlet valve $52_2$ is selectively opened and closed to block or allow communication between pressure control valve 54 and vessel. $24_2$. The pressure control valve 54 is configured so that its downstream side, and thus injection pressure inlet leads $50_1$, $50_2$ are maintained at a certain pressure, so that the combination of pressure within vessels $24_1$, $24_2$ and the cross sectional area in the openings $37_1$, $37_2$ or orifice members $36_1$, $36_2$ delivers the injection material 12 into the injection location 16 at a rate that is substantially the same as a designated amount of flow. Similarly, valve motors $53_1$, $53_2$ are shown coupled to injection pressure inlet valves $52_1$, $52_2$ and which actuate the valves $52_1$, $52_2$ selectively into open and closed position. In an example, the rate of injection material 12 delivered to the injection location 16 is changed by adjusting the pressure control valve 54 to alter fluid pressure downstream of the pressure control valve 54 and thus the one or both of the vessels $24_1$, $24_2$ dispensing the injection material 12.

In an alternative, injection system 10 includes a pressure discharge circuit 56 shown having pressure discharge leads $58_1$, $58_2$ whose ends are in fluid communication respectively with vessels $24_1$, $24_2$. In the illustrated example, the pressure discharge leads $58_1$, $58_2$ physically connect to injection pressure inlet leads $50_1$, $50_2$, however, the pressure discharge leads $58_1$, $58_2$ may alternatively be coupled directly onto vessels $24_1$, $24_2$. Ends of the pressure discharge leads $58_1$, $58_2$ distal from the injection pressure inlet leads $50_1$, $50_2$ terminate into a pressure discharge line 60. Discharge valves $62_1$, $62_2$ are shown integrally disposed within pressure discharge leads $58_1$, $58_2$. Valve motors $63_1$, $63_2$ selectively open and close valves $62_1$, $62_2$ to thereby allow or block pressure communication through leads $58_1$, $58_2$. An end of pressure discharge line 60 distal from discharge valves $62_1$, $62_2$ terminates at a recycle/recovery system 64.

Pressure indicators $66_1$, $66_2$ are illustrated respectively coupled onto vessels $24_1$, $24_2$, that provide an indication of pressure within vessels $24_1$, $24_2$ and that optionally generate a signal representative of a pressure sensed within the vessels $24_1$, $24_2$. Level indicators $68_1$, $68_2$ are also depicted in the illustrated example, that in an alternative detect a level of injection fluid 12 disposed within vessels $24_1$, $24_2$, and which can optionally transmit signals representative of the monitored level. Further schematically illustrated is an example of a controller 70 which in an embodiment is in communication with various components in portions of the chemical injections system 10 via a communication means 72. In an alternative, controller 70 includes an information handling system, that optionally encompasses a processor, memory accessible by the processor, nonvolatile storage area accessible by the processor, and logics for performing each of the steps described. In the illustrated example, the communication means 72 is made up of a number of signal lines $74_{1-n}$, which can be hard wired, wireless telemetry, pneumatic, and other forms of communication between operations hardware, and combinations thereof. In an example, "1-n" represents "1 through n."

Further in the example of FIG. 1, injection pressure inlet valve $52_1$ is shown in outline form to represent an open configuration so that pressure inlet line 48 is in communication with vessel $24_1$ through injection pressure inlet lead $50_1$ and pressure inlet valve $52_1$. In the illustrated example, the pressure in vessel $24_1$ is substantially the same as that in line 48 downstream of pressure valve 54. In contrast, injection pressure inlet valve $52_2$, which is shown in solid form to represent a closed configuration, and when in the closed configuration blocks communication and a flow of pressurized fluid from line 48 and into vessel $24_2$. Additionally in this example, injection material outlet valve $38_1$ is also in an open configuration, which can be accomplished via operation of motor $39_1$, so that injection material within vessel $24_1$ flows through discharge lead $32_1$, discharge line 34, and to the injection location 16. As indicated previously, the amount of flow of injection material 12 being delivered to injection location 16 is a function of the driving pressure within vessel $24_1$, and the ratios of cross sectional areas of the lead line $32_1$, and the reduced cross sectional area of opening $37_1$ in orifice member $36_1$. An advantage of the method and system described is that the need for pumps to inject the injection material 12 is eliminated. Thus the reliability and cost for providing an injection material can be greatly reduced by implementation of the present system.

Figure 2:
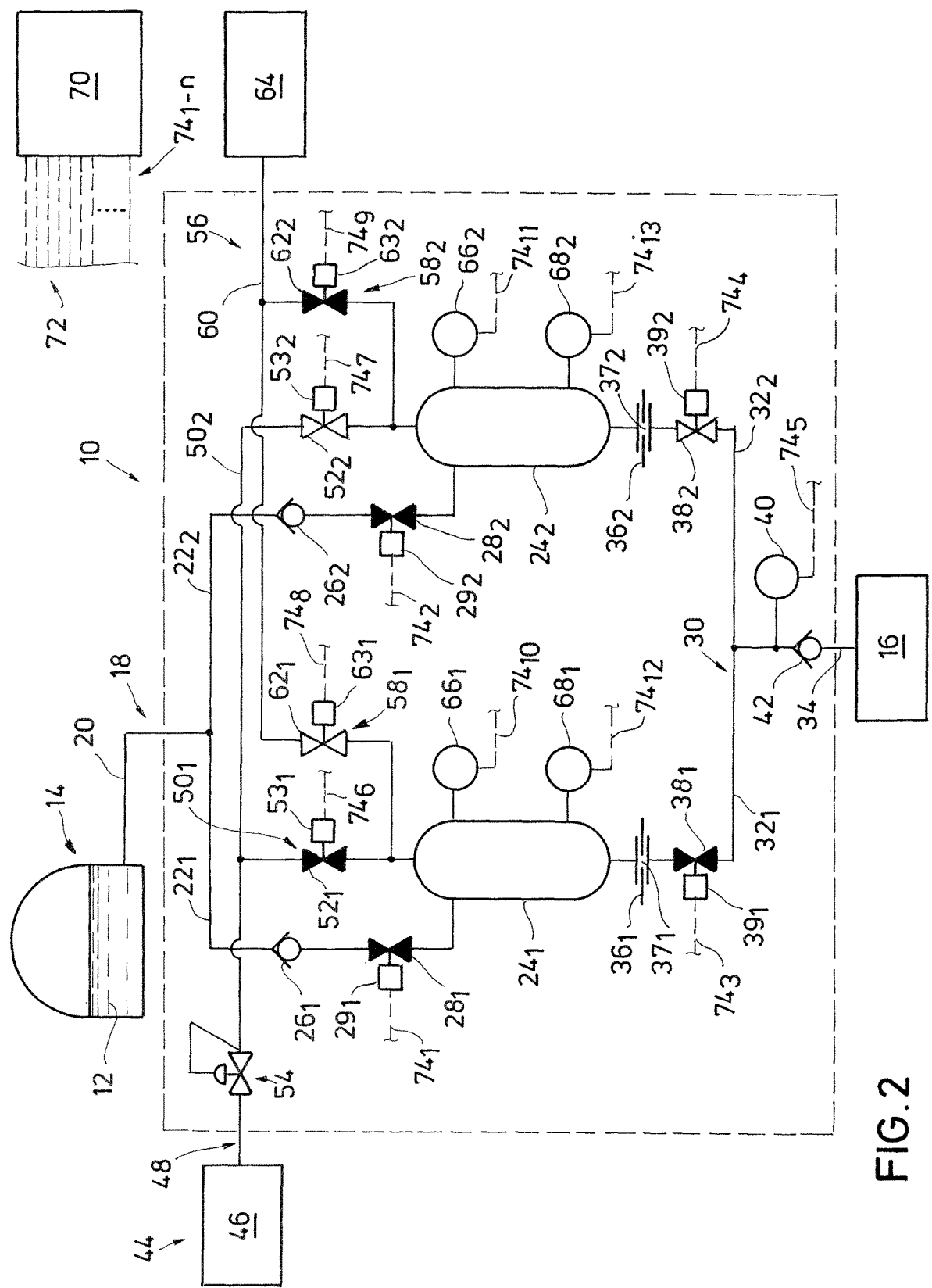
FIG. 2 is a schematic of an example of the injection system of FIG. 1, where injection material is being dispensed from the second vessel and metered with an orifice while the first vessel is being depressurized.

Referring now to FIG. 2, shown is another example where the vessel $24_2$ is being used to provide injection material 12 to the injection location 16. In this example, valves $52_2$, and $38_2$ are shown in the open configuration, so that vessel $24_2$ is in direct communication with pressurized fluid from injection pressure source 46. In an alternative, pressure of the fluid from the source of pressurized fluid 46 and in injection pressure inlet lead $52_2$ (downstream of pressure control valve 56) is maintained at a designated value so that the pressure within vessel $24_2$ is at a particular pressure calculated to deliver injection material 12 at an amount that is substantially the same as a designated amount. Thus examples exist where flow of injection material 12 from vessel $24_2$ to injection location 16 is substantially equal to the designated amount of flow of the injection material 12 into the injection location 16. Further, valves $52_1$ and $38_1$ are in a closed position so that vessel $24_1$ is blocked from communication with the storage tank 14 and the injection location 16. In the illustrated embodiment, pressure discharge valve $62_1$ is shown in an open configuration so that fluid within the vessel $24_1$ vents to the recycle/recovery system 64; that in an embodiment occurs as the injection material 12 is being delivered to the injection location 16 via vessel $24_2$. In an example, fluid from injection system 10 entering the recycle/recovery system 64 is directed to a processing facility (not shown), the injection pressure circuit 44, a flare (not shown), or a flare recovery system (not shown). In an alternative, vessels $24_1$, $24_2$ are put into communication with one another via injection pressure leads $50_1$, $50_2$ so that fluid venting from a one of the vessels $24_1$, $24_2$ is directed to the other one of the vessels $24_1$, $24_2$ and to partially pressurize the other one of the vessels $24_1$, $24_2$. An advantage of this alternative is that less fluid from pressure source is required, and less fluid is sent to the recycle/recovery system 64.

Figure 3:
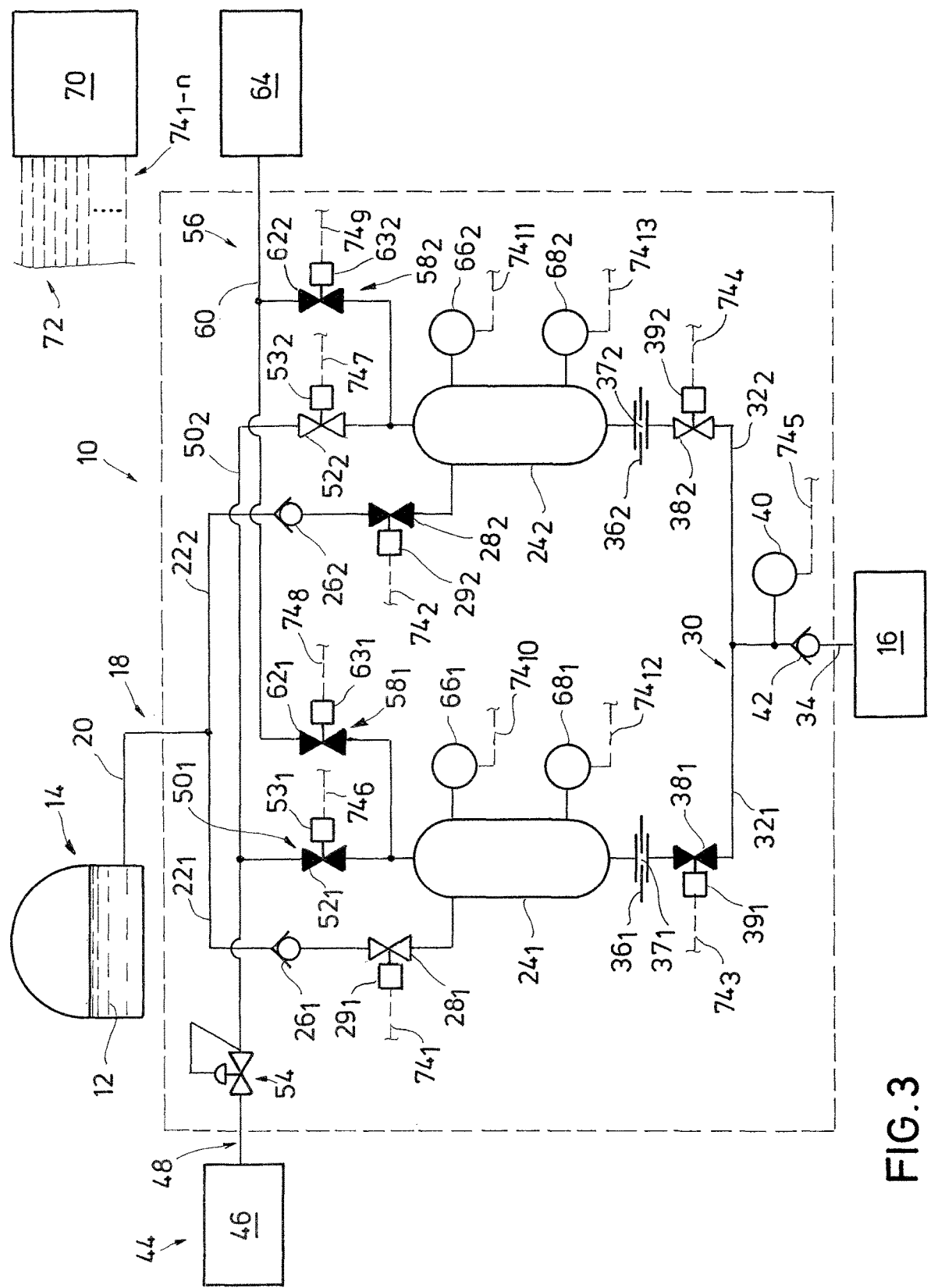
FIG. 3 is a schematic of an example of the injection system of FIG. 1, and where the first vessels is being replenished with injection material, while injection material is being dispensed from the second vessel.

FIG. 3 illustrates an example of the chemical injection system 10 where injection material 12 is being dispensed from vessel $24_2$ to the injection location 16. In this example, injection material outlet valve $38_1$ is in a closed configuration vessel $24_1$ which blocks a flow of injection material 12 through discharge lead $32_1$. Further in the example of FIG. 3, valve $28_1$ is shown in open configuration and allows the flow of injection material 12 from tank 14 into vessel $24_1$. Thus in the example step of operation, injection material 12 is being replenished into vessel $24_1$ while injection material 12 is being distributed to the injection location 16 from vessel $24_2$. Accordingly, the tandem type arrangement illustrated in the accompanying figures allows for the distribution of injection material 12 from one of the vessels $24_1$ or $24_2$ at the same time another one of the vessels $24_1$ or $24_2$ is being replenished with injection material 12.

Figure 4:
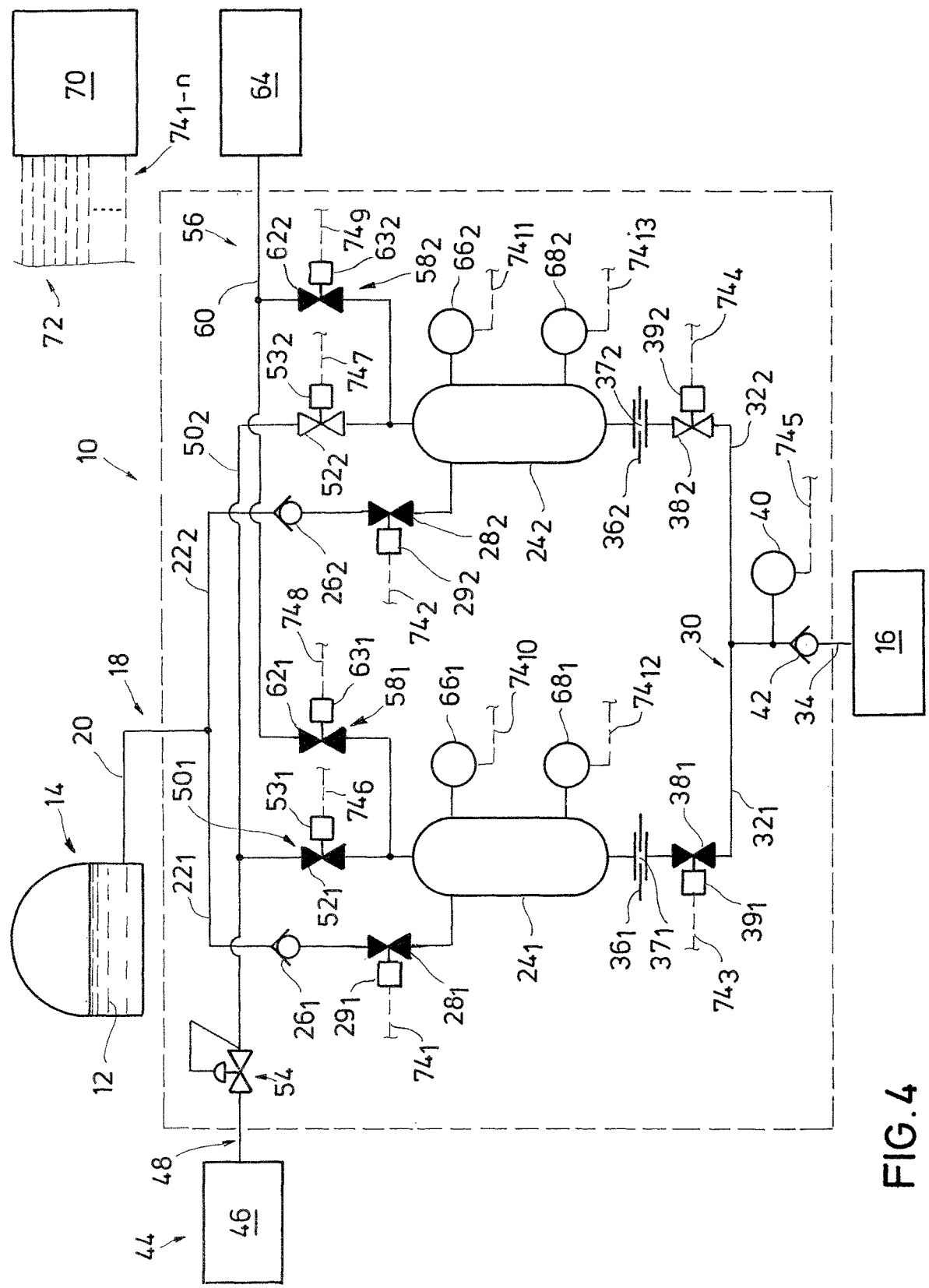
FIG. 4 is a schematic of an example of the injection system of FIG. 1, where injection material is being dispensed from the second vessel while the first vessel contains injection material and is on standby.

FIG. 4 shows an example of operation of the chemical injection system 10 where vessel $24_1$ is isolated from the rest of the injection system 10 due to closure of valves $28_1$, $52_1$, $62_1$, $38_1$, further in this example, valves $52_2$ and $38_2$ are shown in an open configuration allowing dispensing of injection material 12 within vessel $24_2$ to the injection location 16 via valve $38_2$. With valve $52_2$ being open, vessel $24_2$ is in communication with a motive force of pressurized fluid from the injection pressure circuit 44. In an example, the step illustrated in FIG. 4 depicts a scenario where the amount of injection material 12 in vessel $24_1$ is such that additional replenishment of injection material 12 into vessel $24_1$ is deemed unnecessary, or where a level of the injection material 12 in vessel $24_1$ is above a designated high level mark within vessel $24_1$. It is well within the capabilities of one skilled in the art to determine when additional replenishment of injection material 12 into vessel $24_1$ is no longer necessary.

Figure 5:
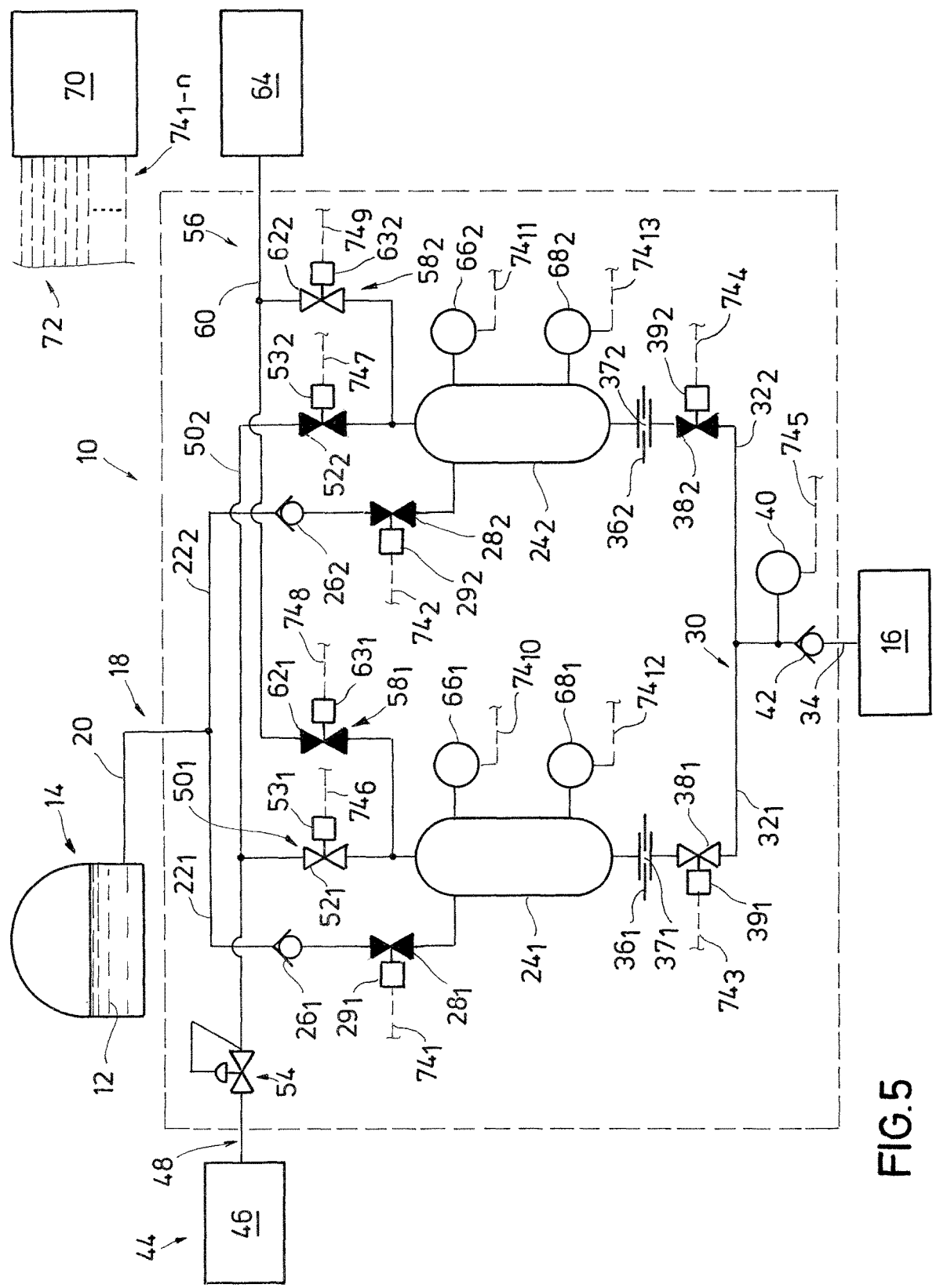
FIG. 5 is a schematic of an example of the injection system of FIG. 1, where injection material is being dispensed from the first vessel while the first vessel is being charged with the pressurized fluid, and the second vessel is being depressurized.

Illustrated in FIG. 5 is another example step of operation of the chemical injection system 10, where injection material 12 within vessel $24_1$ is being dispensed to the injection location 16. Thus in this example, valve $52_1$ and $38_1$ are shown in an open configuration so that injection material 12 flows through lead $32_1$ and line 34 and to injection location 16. Moreover, the motive force provided by pressurized fluid from the injection pressure source 46 is transmitted through valve $52_1$ and into vessel $24_1$. Further illustrated in the example of FIG. 5 is that valve $62_2$ is in an open position thereby allowing communication between the vessel $24_2$ and discharge line 60 for depressurization of vessel $24_2$.

As discussed, examples exist where individual signal lines $74_{1-n}$ provide communication between controller 70 and various components within the chemical injection system 10. In the illustrated example, signal line $74_1$ is shown coupled to valve motor $29_1$, so that signals to open or close valve $28_1$ are directed from controller 70 via signal line $74_1$ to valve motor $29_1$. Further shown in this example is that valve motors $29_2$, $39_1$, $39_2$, $53_1$, $53_2$, $62_1$, $62_2$ are in communication with controller 70 respectively via signal lines $74_2$, $74_3$, $74_4$, $74_6$, $74_7$, $74_8$, $74_9$. Pressure indicators $66_1$, $66_2$ are also depicted as being in communication with controller 70 via signal lines $74_{10}$, $74_{11}$. Thus signals representative of pressure within vessels $24_1$, $24_2$ are optionally transmitted to controller 70 via signal lines $74_{10}$, $74_{11}$. In an embodiment, controller 70 performs calculations based on pressure values received from signal lines $74_{10}$, $74_{11}$, stores the pressure values, or delivers the pressure values in the form of read outs or other forms for uses by operations, personnel or other processing systems. Examples of level indicators $68_1$, $68_2$ are illustrated mounted respectively on vessels $24_1$, $24_2$. As shown, level indicators $68_1$, $68_2$ are in signal communication with controller 70 via signal lines $74_{12}$, $74_{13}$, and which provide signals to the controller 70 that represent a level of injection material 12 in vessels $24_1$, $24_2$. In an example of use, controller 70 monitors physical conditions within the chemical injection system 10, as well as providing control commands for selective opening and closing of the valves within the system. Further illustrated is signal line $74_5$ connected between the flow meter 40 and controller 70, and thus provides signal communication between these two.

In an example, flow through the opening 37 of the orifice member 36 is estimated by Equation 1:

$$Q = C_o A_o = \sqrt{\frac{2\Delta p/\rho}{[1-(A_o/A)^2]}} . \quad \text{Equation 1}$$

Where: Q is flow rate of fluid flowing through orifice;
  $\Delta p$ is pressure drop across the orifice;
  $\rho$ is density of the fluid flowing through orifice;
  $A_o$ is cross sectional area of orifice;
  A is area of pipe in which orifice is disposed (discharge leads $32_1$, $32_2$); and
  $C_o$ is a flow coefficient across the orifice.

Advantages of employing the system and method described include eliminating rotating/reciprocating equipment for providing the motive force to drive the injection material 12 into the injection location 16, which lowers operating cost and reduces maintenance. The system 10 also eliminates leakages and spillage concerns associated with reciprocating and plunger pumps that are commonly used in the industry, and lowers logistics costs, especially in offshore, for maintenance and repair. Accordingly, the method and system described as a reduced operational life cycle cost as compared to conventional chemical injection systems.

In one example of operation, the depressurization, filling, pressurizing, and dispensing of vessels $24_1$, $24_2$ tracks a sequence that follows the example stages illustrated in FIGS. 1-5. In the example stage depicted in FIG. 1, injection material 12 in vessel $24_1$ is dispensed into line $32_1$ from vessel $24_1$ and through open injection material outlet valve $38_1$. Vessel $24_1$ is pressurized with fluid from injection pressure source 46 that flows into vessel $24_1$ through open injection pressure inlet valve $52_1$. During the example step, valves $28_2$, $52_2$, and $38_2$ are closed which blocks fluid communication to and from vessel $24_2$. In the illustrated example, vessel $24_1$ is in an injection mode while vessel $24_2$ is in a standby mode. Because vessel $24_1$ is dispensing injection material 12, for the purposes of discussion herein vessel $24_1$ is configured in an injection mode; and because vessel $24_2$ is isolated from fluid communication with external sources and destinations, for the purposes of discussion herein, vessel $24_2$ is in a standby mode.

In the example stage illustrated in FIG. 2, the operation is altered from the example stage illustrated in FIG. 1 so that pressurized fluid is directed into vessel $24_2$ through open injection pressure inlet valve $52_2$, and injection material 12 is dispensed from vessel $24_2$ through an open injection material outlet valve $38_2$. In this stage, vessel $24_1$ is isolated from injection material inlet line 20, injection pressure inlet line 48, and discharge line 34 respectively by closed valves $28_1$, $52_1$, and $38_1$. Also in FIG. 2, valve $62_1$ is open so that vessel $24_1$ is in fluid communication with recycle/recovery system 64 via pressure discharge line 60. In the example of FIG. 2, vessel $24_1$ is in a depressurization mode while vessel $24_2$ is in an injection mode. In an alternative, a depressurization mode is defined when a one of the vessels $24_1$, $24_2$ is in communication with pressure discharge line 60.

In the example stage of operation depicted in FIG. 3, injection material inlet valve $28_1$ is in the open position so that storage tank 14 is in communication with vessel $24_1$ and injection material 12 is flowable into vessel $24_1$. At the same time injection material 12 is flowing into vessel $24_1$, injection material 12 is being dispensed from vessel $24_2$ through open injection material outlet valve $38_2$ and on to discharge line 34. Pressurized fluid is communicated to vessel $24_2$ through lead $50_2$ and open valve $52_2$. In one embodiment of FIG. 3, because injection material 12 is flowing into vessel $24_1$, for the purposes of discussion herein vessel $24_1$ is in a refill mode and vessel $24_2$ is in an injection mode. In an example, a refill mode is defined when a one of the vessels $24_1$, $24_2$ is receiving injection material 12.

In the example stage of operation illustrated in FIG. 4, injection material inlet valve $28_1$ is shown in the closed configuration, which blocks the flow of injection material 12 into vessel $24_1$; in an example this step is undertaken after a designated amount of injection material 12 has been directed into vessel $24_1$. Examples exist where a designated amount of injection material 12 in vessel $24_1$ (or vessel $24_2$) is established by a particular operating scenario, when the vessel $24_1$ (or vessel $24_2$) is full, or based on a predetermined level in vessel $24_1$ as sensed by level indicator $68_1$ (or level indicator $68_2$). Also illustrated in FIG. 4 are that valves $38_1$, $52_1$, and $62_1$ are closed, which isolates vessel $24_1$ respectively from discharge line 34, injection pressure source 46, and recycle/recovery system 64. At the same time, vessel $24_2$ is being pressurized and is dispensing injection material via open valves $52_2$ and $38_2$ respectively. In the example of FIG. 4, vessel $24_1$ is in the standby mode and vessel $24_2$ is in the injection mode.

In another stage of operation as shown in FIG. 5, vessel $24_1$ is being pressurized by flow of pressurized fluid through open injection pressure inlet valve $52_1$, and injection material 12 is being dispensed from vessel $24_1$ via open injection material outlet valve $38_1$. Injection material 12 is not being dispensed from vessel $24_2$ as injection material outlet valve $38_2$ is closed, and pressurized fluid is blocked from communication with vessel $24_2$ as injection pressure inlet valve $52_2$ is also closed. Instead, pressure discharge valve $62_2$ is open and fluid in vessel $24_2$ vents to recycle/recovery system 64 through pressure discharge line 60, which lowers pressure in vessel $24_2$ allowing vessel $24_2$ to be replenished with injection material 12. In the embodiment of FIG. 5, vessel $24_1$ is in the injection mode while vessel $24_2$ is in the depressurization mode. In one example, the chemical injection system 10 is returned to its configuration of FIG. 1 and sequence of stages described previously is repeated.

In an example sequence of operational stages, a one of the vessels $24_1$, $24_2$ is depressurized, filled/refilled, and then in standby mode while injection material 12 is dispensed from the other one of the vessels $24_1$, $24_2$. Further in this example, while injection material 12 is dispensed from the a one of the vessels $24_1$, $24_2$, the other one of the vessels $24_1$, $24_2$ is depressurized, filled/refilled, and then put into standby mode. Thus in an embodiment injection material 12 is continuously dispensed to the injection location 16 by selective switching of dispensing injection material 12 from either of the vessels $24_1$, $24_2$ while the other is being depressurized, then filled/refilled, and then put in standby mode.

The methods and systems of the present disclosure, therefore, are well adapted to carry out the objects and attain the ends and advantages mentioned, as well as others inherent. While a presently preferred embodiment of the method and system has been given for purposes of disclosure, numerous changes exist in the details of procedures for accomplishing the desired results. For example, the vessels, valves, and associated instrumentation can all be mounted onto a single skid unit. Furthermore, it should be pointed out, that while a pair of vessels $24_1$, $24_2$ is illustrated in the figures, a single vessel can be used where there flow of injection material 12 is regulated across an orifice 36, and more than two vessels may be included as an alternate embodiment. In the alternate embodiments having a plurality of vessels, the number of inlet leads, outlet leads, and orifices corresponds to the number of vessels. In an embodiment, a single vessel embodiment can be used for batch processing, whereas multi-vessel embodiments are used in continuous chemical injection. In another alternative, injection material 12 is dispensed from both vessels $24_1$, $24_2$ at the same time. These and other similar modifications will readily suggest themselves to those skilled in the art, and are intended to be encompassed within the spirit of the present disclosure and the scope of the appended claims.

What is claimed is:

1. A method of dispensing an injection material comprising:
    a. directing injection material into a first vessel;
    b. pressurizing the first vessel to a specified pressure;
    c. discharging a designated amount of the injection material from the first vessel and through a discharge line coupled with the first vessel;
    d. controlling a rate of the injection material being discharged from the first vessel by introducing a pressure drop in the discharge line;
    e. directing the injection material from the first vessel to an injection location;
    f. depressurizing the first vessel; and
    g. repeating steps (a)-(f) using a second vessel.

2. The method of claim 1, further comprising regulating a flow of the injection material directed from the first vessel with a planar orifice having an opening with a designated cross sectional area, and that is disposed in the discharge line.

3. The method of claim 1, wherein pressurizing the first vessel comprises providing fluid to the first vessel through an injection pressure inlet line, and wherein the injection pressure inlet line is in communication with the discharge line through a single path that extends through the first vessel.

4. The method of claim 3, wherein pressure in the injection pressure inlet line is greater than a pressure in the discharge line.

5. The method of claim 4, where an inlet piping circuit provides fluid communication between a tank in which injection material is stored and the first and second vessels, and a discharge circuit provides fluid communication between the first and second vessels and the injection location.

6. The method of claim 5, where valves are provided in the inlet piping circuit and the discharge circuit that are selectively opened and closed to selectively direct injection material from and to the vessels.

7. The method of claim 6, further comprising using a controller to direct command signals to actuators mounted to the valves for opening and closing the valves.

8. The method of claim 1, further comprising venting pressurized fluid from one of the first or second vessels to a recycle/recovery system.

9. The method of claim 1, wherein the injection material flows to the injection location continuously and uninterrupted, wherein the first vessel is pressurized with a pressure source that is at a fixed pressure, and wherein the injection location is at a fixed pressure.

10. The method of claim 1, further comprising venting pressurized fluid between the first and second vessels.

11. A method of dispensing an injection material comprising:
   a. directing injection material into a vessel;
   b. directing pressurized fluid across a pressure control valve and to the vessel to pressurize the vessel to a specified pressure;
   c. discharging a designated amount of the injection material from the vessel to an injection location; and
   d. controlling the amount of injection material flowing from the vessel at the designated amount by flowing the injection material through an orifice having an opening with a particular cross sectional area in conjunction with maintaining a pressure of the pressurized fluid directed across the pressure control valve at the specified pressure.

12. The method of claim 11, wherein the vessel comprises a first vessel, the method further comprising depressurizing the first vessel; and repeating steps (a)-(d) using a second vessel.

13. The method of claim 11, further comprising estimating a rate that the injection material flows through the orifice with the following equation:

$$Q = (C) * (A_o) = \sqrt{\frac{2\Delta p/\rho}{1 - \left(\frac{A_o}{A}\right)^2}} ;$$

where:
Q=flow rate of fluid flowing through orifice,
Δp=pressure drop across orifice,
ρ=density of the fluid flowing through the orifice,
$A_o$=the cross sectional area of the opening in the orifice,
A=area of the pipe in which the orifice is disposed, and
$C_o$=the flow coefficient across the orifice.

14. A system for dispensing injection material comprising:
   a vessel that selectively contains injection material;
   a pressure control valve having in inlet in communication with a pressure source, and an outlet in communication with the vessel having a varying pressure so that pressure in the vessel is at a designated value;
   a piping circuit having ends connected to the vessel and to an injection location so that the vessel and injection location are in communication through the piping circuit;
   an orifice in the piping circuit having an opening with a particular cross sectional area; and
   a controller in signal communication with the pressure control valve and a flow-meter in the piping circuit that provides commands to the pressure control valve based on a comparison of a rate of flow of the injection material measured by the flowmeter and a designated rate of flow of the injection material.

15. The system of claim 14, where the particular cross sectional area of the opening in the orifice is strategically sized, so that the rate of flow of injection material is substantially the same as the designated amount of injection material is metered to the injection location when pressure at the pressure control valve outlet is substantially at the designated value.

16. The system of claim 14, where the vessel comprises a first vessel, and where the system comprises a second vessel.

17. The system of claim 16, where the piping circuit further comprises inlet piping in communication with inlets formed in the first and second vessels and also in communication with a tank in which injection material is stored.

18. The system of claim 14, further comprising a pressure discharge lead having an end attached to the vessel and that is in communication with a recycle/recovery system and a pressure inlet lead having an end connected to the vessel and that is in communication with the pressure source, and wherein a portion of the pressure discharge lead and the pressure inlet lead share a common length of piping.

19. The system of claim 14, where the injection location comprises a position that is selected from the group consisting of a portion of a processing facility and a storage tank.

20. The system of claim 14, where the injection material alters a physical property of compounds in the injection location.

* * * * *